United States Patent
Bechtle

[11] Patent Number: 5,216,406
[45] Date of Patent: Jun. 1, 1993

[54] MOTOR VEHICLE HAVING A CENTRAL LOCKING SYSTEM AND AN ANTI-THEFT ALARM SYSTEM

[75] Inventor: Rolf Bechtle, Bietigheim-Bissingen, Fed. Rep. of Germany

[73] Assignee: Dr. Ing. H.C.F. Porsche AG, Fed. Rep. of Germany

[21] Appl. No.: 738,047

[22] Filed: Jul. 31, 1991

[30] Foreign Application Priority Data

Jul. 31, 1990 [DE] Fed. Rep. of Germany ....... 4024224

[51] Int. Cl.⁵ .............................. B60R 25/10
[52] U.S. Cl. .................... 340/426; 340/430; 340/542; 307/10.2; 70/264
[58] Field of Search ............. 340/425.5, 426, 430, 340/542, 543; 307/9.1, 10.1, 10.2; 70/262, 263, 264

[56] References Cited

U.S. PATENT DOCUMENTS

| | | |
|---|---|---|
| 4,574,268 | 3/1986 | Ohnishi . |
| 4,754,255 | 6/1988 | Sanders et al. . |
| 4,819,050 | 4/1989 | Manzoni ............... 340/425.5 |
| 4,855,710 | 8/1989 | Kikuchi et al. ......... 340/542 |
| 4,887,065 | 12/1989 | Robitschko et al. ..... 340/430 |
| 4,926,160 | 5/1990 | Hwang .................. 340/426 |
| 4,933,664 | 6/1990 | Igawa et al. .......... 340/425.5 |
| 4,963,856 | 10/1990 | Yukitumo ............... 340/426 |
| 4,983,947 | 1/1991 | Mullen et al. ........... 340/542 |
| 5,113,182 | 5/1992 | Suman et al. ............ 340/426 |

FOREIGN PATENT DOCUMENTS

| | | |
|---|---|---|
| 3537903 | 4/1983 | Fed. Rep. of Germany . |
| 3413776 | 10/1985 | Fed. Rep. of Germany . |
| 3413775 | 11/1985 | Fed. Rep. of Germany . |
| 3447037 | 10/1986 | Fed. Rep. of Germany . |
| 3609428 | 9/1987 | Fed. Rep. of Germany . |
| 8714628 | 5/1988 | Fed. Rep. of Germany . |
| 8810641 | 11/1988 | Fed. Rep. of Germany . |
| 3736776 | 1/1989 | Fed. Rep. of Germany . |
| 3825548 | 2/1989 | Fed. Rep. of Germany . |
| 3737209 | 5/1989 | Fed. Rep. of Germany . |
| 3821561 | 12/1989 | Fed. Rep. of Germany . |
| 6050050 | 8/1983 | Japan . |

OTHER PUBLICATIONS

Der neue Mercedes-Benz Roadster-Karosserie: Klimatisierung verdeck und Schliebung, pp. 309-318.

Primary Examiner—Jin F. Ng
Assistant Examiner—Nina Tong
Attorney, Agent, or Firm—Evenson, McKeown, Edwards & Lenahan

[57] ABSTRACT

A motor vehicle including a central locking system as well as an anti-theft alarm system is controlled by a control unit common to both systems. The locked state and the unlocked state of all locks or doors of the motor vehicle are monitored by means of additional switching contacts and an activating of the alarm system is prevented if at least one of the locks is not in the locked state. An activating of the alarm ready state of the alarm system is nevertheless possible by operating a key-operated lock a certain number of times within a specific limited time period.

20 Claims, 1 Drawing Sheet

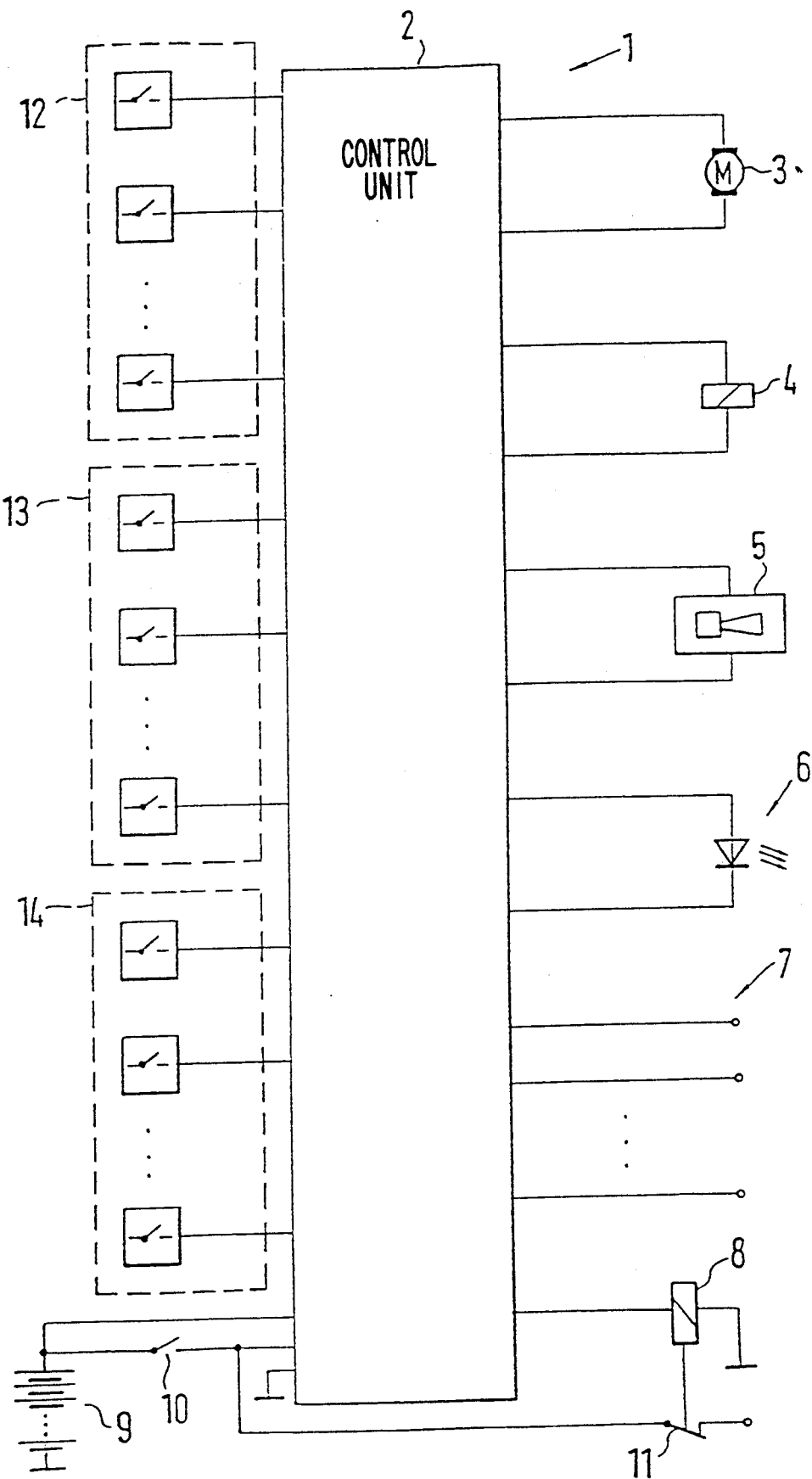

MOTOR VEHICLE HAVING A CENTRAL LOCKING SYSTEM AND AN ANTI-THEFT ALARM SYSTEM

BACKGROUND AND SUMMARY OF THE INVENTION

The invention relates to a motor vehicle having a central locking system and an anti-theft alarm system and, more particularly, to a motor vehicle having at least two doors and a closable and lockable trunk. The doors are automatically lockable and unlockable by means of a central locking system by way of a lock operation by means of key-operated locks in a pair of doors.

The central locking system is controlled by means of a first group of switching contacts on the locks and access to the interior of the motor vehicle is monitored by means of an anti-theft alarm system. The alarm readiness of the anti-theft alarm system is able to be activated by the switching contacts of the first group of switching contacts during the locking and is able to be deactivated during the unlocking. The alarm readiness of the anti-theft alarm system is displayed by an electro-optical display element in the locking buttons by means of flashing. The triggering of an alarm takes place by the alarm-ready anti-theft alarm system by at least one of its switching contacts of the group of second switching contacts changing from its inactive to the active state noting the accessing of the vehicle or its unauthorized use.

A motor vehicle with a closable and lockable trunk and at least two doors which can be automatically locked and unlocked by means of a central locking system by way of an operating of a lock by means of key-operated locks, is disclosed in the German Patent Document DE-88 10 641.1. The central locking system is controlled by means of a first group of switching contacts on the locks. An anti-theft alarm system monitors an accessing of the interior of the motor vehicle. An alarm readiness of the anti-theft alarm system is activated during the locking by means of the switching contacts of the first group of switching contacts and is deactivated during the unlocking. By means of two switching contacts, which record an accessing of the vehicle or its unauthorized use, the triggering of an alarm finally takes place by means of the alarm-ready anti-theft alarm system.

From the German Patent Document DE-3821561A, an arrangement has become known for the visual display of the readiness of a vehicle alarm system. For this purpose, an electro-optical display element is inserted into at least one locking button of a vehicle door lock. This display element generates a flashing signal when the anti-theft alarm system is switched to alarm-ready. The display element, which is constructed as a light-emitting diode, is operated in the pulse operation with a no-pulse period which is relatively long in comparison to the flash pulse.

Since the central locking system as well as the anti-theft alarm system are partly controlled by the same switching contacts, relatively high wiring expenditures are required. In the case of the above-mentioned system, it is also possible that, in the case of a malfunctioning or a partial malfunctioning of the central locking system, that the alarm system and its function display are nevertheless activated although possibly one or several doors or other openings of the motor vehicle are not properly locked.

There is therefore needed a motor vehicle having a central locking system and an anti-theft alarm system in which the wiring expenditures of both systems are reduced and an unintentional activating of the alarm system during a malfunctioning of the central locking system is avoided.

This need is met by a central locking and anti-theft alarm system which is controlled by a control unit common to both systems. The locked state and the unlocked state of all locks or doors and of the trunk lid is monitored by the control unit by means of a third group of switching contacts. When it is recognized that at least one signal, characterizing the locked state, of the switching contact or switching contacts of the third group of switching contacts, is absent after at least one key operation of a lock in the locking direction, the activating of the alarm system is prevented and a corresponding warning signal is emitted by way of the electro-optical display elements in the locking buttons.

The principal advantages of the invention are that, by the use of a common control unit for the central locking system and the anti-theft alarm system and the use of common switching contacts, the wiring expenditures are reduced. Further, the locked state and the unlocked state of all doors and of the trunk lid is monitored by the control unit by means of another group of switching contacts. When a signal of these switching contacts is recognized which does not occur after at least one operating of the key in a lock in the locking direction, an activating of the alarm system is prevented and a corresponding warning signal is emitted by way of the light emitting diodes in the door buttons.

In a further development of the invention, an activating of the alarm system is nevertheless possible in such a case. Likewise, after a manual locking of all doors, the alarm system can be activated by an operating of the key-operated lock in the locking direction.

Other objects, advantages and novel features of the present invention will become apparent from the following detailed description of the invention when considered in conjunction with the accompanying drawings.

BRIEF DESCRIPTION OF THE DRAWINGS

The sole FIGURE shows a block diagram of a central locking system and an anti-theft alarm system with a control unit common to both systems.

DETAILED DESCRIPTION OF THE DRAWINGS

Referring to FIG. 1, there is shown a central locking and anti-theft alarm system 1. A control unit 2, which both systems have in common, controls one or several electric motors 3 and/or solenoids 4 which are used for the electromechanical or electropneumatic locking or unlocking of the locks in the doors and lids, e.g. trunk lid, filler cap, engine hood, etc. The alarm system part operates one or several alarm elements 5, such as a vehicle horn or the headlights or flashers of the motor vehicle. Electro-optical display elements 6, which are preferably constructed as light-emitting diodes and are arranged in the lock buttons of the vehicle doors, indicate the state of the whole system.

By way of additional outputs 7, controlled by the control unit 2, when the alarm system is in a ready state, additional external monitoring elements may be actively controlled, for example, for the ultrasonic monitoring of the vehicle interior, i.e., motion detecting device, or for determining whether the vehicle is being moved away from its parked location.

Finally, a relay 8 controlled by the control unit 2 is used for securing the motor vehicle from being driven away in that, when the alarm system is switched to a ready state and when the ignition current is switched on by a vehicle battery 9, e.g., by means of an ignition switch 10, the ignition current is interrupted by means of a break 11 of the relay 8. As a result, the signal of the ignition switch 10 is an input quantity of the control unit 2.

Naturally, the control unit 2 is supplied with current by way of the vehicle battery 9. For buffer purposes, an accumulator, which is not shown, may also be provided in the control unit 2.

A first group of switching contacts 12 is assigned to the key-operated locks in at least one pair of vehicle doors. One of the switching contacts respectively of the first group 12 is activated when the locks are locked and one respectively is activated (controlled to be active) when the locks are unlocked. By means of the activating of these switching contacts, finally the control of the electric motors 3 or solenoids 4 takes place for the locking and unlocking of the vehicle accesses. Likewise, by means of this first group of switching contacts 12, the alarm readiness of the anti-theft alarm system can be activated during the locking and deactivated during the unlocking.

A second group of switching contacts 13 is used for monitoring access to the vehicle or its unauthorized use when the anti-theft alarm system is switched to the alarm-ready state. These switching contacts of the second group 13 particularly monitor the doors, trunk lid, engine hood, a filler cap, a cover of the glove compartment, a correct installation of the car radio or opening of a movable roof part or (by means of the additional external monitoring elements) movements of the vehicle itself or of objects in the vehicle. The triggering of the alarm system and thus the controlling of the alarm elements 5, in this case, takes place by a changing of one of these switching contacts of the second group 13 from an inactive to the active state, for example, by the opening of a vehicle door. For this purpose, for example, door switches for the interior lighting of the vehicle may be used.

Since, however, the first group of switching contacts 12 causes only the controlling of the central locking system and cannot also monitor its correct functioning (the switching contacts are constructed as touch contacts), a third group of switching contacts 14 is provided which monitors the locked state and the unlocked state of all doors and lids of the motor vehicle and its locks. When such a recognition of the signal, which characterizes the locked state, of the switching contact or contacts of the third group 14 does not occur, after at least one key operation in a lock in the locking direction, by one of the switching contacts of the first group 12, an activating of the alarm system is prevented and a corresponding warning signal is emitted by means of the electro-optical display elements 6 in the locking buttons.

When the signal, which characterizes the locked state, of at least one switching contact of the third group 14 is absent after the recognition of a key operation in a key in the locking direction by a switching contact of the first group 12, the activating of the alarm system can be made possible by a specific number of (three) operations of the key-operated lock within a certain limited time period in the locking direction even in the case of at least one unlocked or unlockable or manually locked vehicle door.

Likewise, it is possible, after the manual locking of all doors, to activate the alarm ready state of the alarm system by an operating of the key-operated lock in the locking direction, if the locked state of all doors is recognized by the switching contacts of the third group 14.

The central locking and alarm system also comprises a number of additional functions which will be explained in the following.

Thus, for example, after the expiration of an inoperative period after the activating of the alarm system, a triggering of the alarm system may take place only by those switching contacts of the second group 13 which were inactive during the entire inoperative period (doors locked). The other switching contacts can trigger the alarm system only after the transition into the inactive state or after an inoperative period which started after it.

If during an inoperative period after the activating of the alarm system, the ignition lock 10 of the motor vehicle is operated, the alarm system is deactivated. When the ignition lock 10 of the motor vehicle is operated after the expiration of the inoperative period, the ignition current to an internal-combustion engine of the motor vehicle is interrupted by means of the relay 8 and the break 11, and the alarm is triggered (securing the car from being driven away).

With the operating of a motor vehicle trunk lock, in the unlocking direction, an already activated alarm system is deactivated at least as long as the corresponding switching contact of the second group, which monitors the opened trunk, is active.

Finally, an external auxiliary device for the monitoring of the motor vehicle with respect to movements of the motor vehicle itself or movements in the vehicle can be activated by way of the outputs 7 by means of the alarm system. Further, the external auxiliary device can be activated after an inoperative period if, during the entire inoperative period, all switching contacts of the second group 13 were inactive. Finally, the external auxiliary device can be activated following the transition of all switching contacts of the second group 13 into the inactive state after the inoperative period has again elapsed. With the deactivating of the alarm readiness, the exterior auxiliary device is also switched off.

Finally, using the third group of switching contacts 14, an attempt to unlock a door can be checked when the alarm system is activated, and the alarm system can be triggered.

The central locking system provides several other functions. If an attempt is made to activate the central locking system into the locking direction when the vehicle door is open, the central locking system is unlocked. Likewise, an overload safety device may be provided which permits a frequent operating of the central locking system within a specific time period and then prevents further operations at least for a certain time period. However, it is provided, in this case, that the central locking system may be unlocked one final time more.

The joint control unit 2 may have a self-analysis function which tests its overall operability after the activating of the alarm system. Errors in the central locking or alarm system or triggered alarms, while detecting marginal conditions, are stored in an error memory of the control unit when they arise. It is also noted in the error memory when the alarm system could be activated only by a repeated operating of the key-operated lock in the locking direction within a certain time period.

Finally, it is provided to display the operating condition of the central locking system and the alarm system by means of the light emitting diodes in the locking buttons. For the identification of the respective operating condition, the light emitting diodes are controlled by means of different or distinguishable flashing signals.

The optoelectronic display element is, for example, not controlled when (1) the self-analysis recognizes errors during the inoperative period; (2) in the case of a no-error self-analysis, during the inoperative period, the central locking system cannot be locked and the key-operated lock was not operated three times within a certain time period or (3) when active switching contacts of the second group 13, for example, indicate opened vehicle doors.

When the system functions correctly, the electro-optical display elements flash fast during the inoperative period.

When, while the system functions correctly, the inoperative period has expired and all switching contacts of the second group 13 are inactive, and when the central locking system is locked and was not locked three times successively at short intervals, and when there is no alarm, the electro-optical display elements 6 flash with a normal flashing sequence in which the switch-on times are relatively short in comparison to the switch-off times. The alarm readiness of the anti-theft alarm system will then be activated.

If the central locking system was locked three times at short intervals without the recognition of an error during the inoperative period, a double flashing signal is emitted by way of the electro-optical display element 6 and the alarm readiness is not activated. The display elements 6 are controlled twice successively at two brief intervals, followed by a longer flashing pulse pause. After the expiration of the inoperative period, the alarm readiness is activated, but the double flashing signal continues to be emitted. As a result, it is indicated that either a door is not locked or the corresponding signal of the third group of switching contacts is absent.

Likewise, this double flashing takes place when, after the expiration of the inoperative period, switching contacts of the second group 13 are active and thus indicate, for example, an opened vehicle door. Finally, the double flashing also takes place during or after the sounding of an alarm.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A motor vehicle central locking system and anti-theft alarm system wherein said motor vehicle has at least two doors and a closable and lockable trunk, said doors having key operated locks and being automatically lockable and unlockable by the central locking system via operating the key-operated locks and wherein access to the motor vehicle interior is monitored by the anti-theft alarm system, the central locking and alarm system comprising:

a first group of switching contacts arranged in the key-operated locks for controlling the central locking system and for activating and deactivating the alarm ready state of the anti-theft alarm system during locking and unlocking of the key-operated locks, respectively;

an electro-optical display element arranged in locking buttons for displaying the alarm ready state via a flashing of said display element;

a second group of switching contacts, each of said contacts having an active and an inactive state wherein an alarm is triggered indicating access or unauthorized use of the motor vehicle by at least one of said second group of switching contacts changing from its inactive state to the active state;

a control unit for controlling both the central locking and anti-theft alarm system;

a third group of switching contacts indicating a locked and unlocked state of said doors and trunk for allowing said control unit to monitor the locked and unlocked state of said doors and trunk, wherein activation of the anti-theft alarm system is prevented and a warning signal is emitted via said electro-optical display element when said control unit recognizes that at least one signal indicating the locked state from at least one contact of said third group of switching contacts is absent after at least one key operation of said key-operated locks in a locking direction.

2. A motor vehicle according to claim 1, wherein after recognizing that said at least one signal indicating the locked state from at least one contact of said third group of switching contacts is absent after at least one key operation of the key-operated lock in the locking direction, the alarm system is activated by a predetermined number of key operations of the key-operated lock in the locking direction within a certain limited time period even when at least one vehicle door is unlocked or unlockable or locked manually.

3. A motor vehicle according to claim 1, wherein after a manual locking of all doors and the presence of the signals of the third group of switching contacts which indicate the locked state of all doors, the activating of the alarm system is made possible by a key operation of the key-operated lock in the locking direction.

4. A motor vehicle according to claim 2, wherein after a manual locking of all doors and the presence of the signals of the third group of switching contacts which indicate the locked state of all doors, the activating of the alarm system is made possible by a key operation of the key-operated lock in the locking direction.

5. A motor vehicle according to claim 1, wherein after the expiration of an inoperative period, said period beginning after the activating of the alarm system, a triggering of the alarm system is possible by only those switching contacts of the second group of switching contacts which were inactive during the entire inoperative period, while the active switching contacts can trigger the alarm system in each case only after one of: the transition into the inactive state, and after the expiration of an inoperative period which started after the transition into the inactive state.

6. A motor vehicle according to claim 2, wherein after the expiration of an inoperative period, said period beginning after the activating of the alarm system, a triggering of the alarm system is possible by only those switching contacts of the second group of switching contacts which were inactive during the entire inoperative period, while the active switching contacts can trigger the alarm system in each case only after one of: the transition into the inactive state, and after the expiration of an inoperative period which started after the transition into the inactive state.

7. A motor vehicle according to claim 3, wherein after the expiration of an inoperative period, said period beginning after the activating of the alarm system, a triggering of the alarm system is possible by only those switching contacts of the second group of switching contacts which were inactive during the entire inoperative period, while the active switching contacts can trigger the alarm system in each case only after one of: the transition into the inactive state, and after the expiration of an inoperative period which started after the transition into the inactive state.

8. A motor vehicle according to claim 1, wherein when an ignition lock of the motor vehicle is operated before the expiration of the inoperative period, the alarm system is deactivated.

9. A motor vehicle according to claim 7, wherein when an ignition lock of the motor vehicle is operated before the expiration of the inoperative period, the alarm system is deactivated.

10. A motor vehicle according to claim 1, wherein when an ignition lock of the motor vehicle is operated, after the expiration of the inoperative period, the ignition current to an internal-combustion engine of the vehicle is interrupted, and an alarm is triggered.

11. A motor vehicle according to claim 9, wherein when the ignition lock of the motor vehicle is operated, after the expiration of the inoperative period, the ignition current to an internal-combustion engine of the vehicle is interrupted, and an alarm is triggered.

12. A motor vehicle according to claim 1, wherein when a trunk lock is operated in the unlocking direction, an already activated alarm system remains deactivated at least as long as the corresponding switching contact of the second group of switching contacts is active.

13. A motor vehicle according to claim 11, wherein a trunk lock is operated in the unlocking direction, an already activated alarm system remains deactivated at least as long as the corresponding switching contact of the second group of switching contacts is active.

14. A motor vehicle according to claim 1, wherein an external auxiliary device for the alarm system for monitoring of the motor vehicle is controlled to be active if the alarm system is activated and, during the entire inoperative period, all switching contacts of the second group of switching contacts were inactive or after the transition of all switching contacts of the second group into the inactive state if the inoperative period has again expired.

15. A motor vehicle according to claim 13, wherein an external auxiliary device for the alarm system for monitoring of the motor vehicle is controlled to be active if the alarm system is activated and, during the entire inoperative period, all switching contacts of the second group of switching contacts were inactive or after the transition of all switching contacts of the second group into the inactive state if the inoperative period has again expired.

16. A motor vehicle according to claim 1, wherein the control unit has a self-analysis function which, after the activating of the alarm system, tests its operability.

17. A motor vehicle according to claim 15, wherein the control unit has a self-analysis function which, after the activating of the alarm system, tests its operability.

18. A motor vehicle according to claim 16, wherein errors in the alarm system and triggered alarms, while marginal conditions are detected, are stored in an error memory of the control unit.

19. A motor vehicle according to claim 16, wherein the operating state of the alarm system is displayed by the electro-optical display elements in the locking buttons and, for the identification of the respective operating state, the electro-optical display elements are controlled by means of different flashing signals.

20. A motor vehicle according to claim 18, wherein the operating state of the alarm system is displayed by the electro-optical display elements in the locking buttons and, for the identification of the respective operating state, the electro-optical display elements are controlled by means of different flashing signals.

* * * * *